US008407009B2

(12) United States Patent
Hiyama et al.

(10) Patent No.: US 8,407,009 B2
(45) Date of Patent: Mar. 26, 2013

(54) SYSTEM AND METHOD FOR MOLECULAR COMMUNICATION

(75) Inventors: Satoshi Hiyama, Yokohama (JP); Yuki Moritani, Yokohama (JP); Tatsuya Suda, Fallbrook, CA (US); Junichi Kikuchi, Ikoma (JP); Yoshihiro Sasaki, Ikoma (JP)

(73) Assignees: NTT DoCoMo, Inc., Tokyo (JP); National University Corporation Nara Institute of Science and Technology, Ikoma-shi (JP)

( * ) Notice: Subject to any disclaimer, the term of this patent is extended or adjusted under 35 U.S.C. 154(b) by 1267 days.

(21) Appl. No.: 11/841,338

(22) Filed: Aug. 20, 2007

(65) Prior Publication Data

US 2008/0061947 A1 Mar. 13, 2008

(30) Foreign Application Priority Data

Sep. 13, 2006 (JP) ................................. 2006-248444

(51) Int. Cl.
*G06F 19/10* (2011.01)
*C12Q 1/58* (2006.01)
*C12P 19/34* (2006.01)
(52) U.S. Cl. ............................ 702/19; 435/6.1; 977/702
(58) Field of Classification Search ........................ None
See application file for complete search history.

(56) References Cited

FOREIGN PATENT DOCUMENTS

| JP | 5-175574 | 7/1993 |
| JP | 7-122628 | 12/1995 |

OTHER PUBLICATIONS

Raymo et al. (Advanced Materials (2002) vol. 14, No. 6, pp. 401-414).*
Kentaro Fukuda, et al., "Dynamic Behavior of a Transmembrane Molecular Switch as an Artificial Cell-Surface Receptor", Journal of Molecular Catalysis B: Enzymatic 11, XP002457861, 2001, pp. 971-976.
Yuki Moritani, et al., "Molecular Communication for Health Care Applications", Proceedings of the Fourth Annual IEEE International Conference on Pervasive Computing and Communications Workshops, XP010910598, Mar. 13, 2006, pp. 549-553.
Tatsuya Suda, et al., "Exploratory Research on Molecular Communication Between Nanomachines", Genetic and Evolutionary Computation Conference, XP002443912, vol. 1, Jun. 25, 2005, 5 pages.
S. Hiyama, et al., "Molecular Communication," Proceedings on NSTI Nanotechnology Conference and Trade Show, vol. 3, May 2005, pp. 391-394.
S. Hiyama, et al., "Molecular Communication," The Institute of Electronics, Information and Communication Engineers Magazine, vol. 89, No. 2, Feb. 2006, pp. 162-166 and 2 cover pages.
Y. Moritani, et al., "Molecular Communication among Nanomachines Using Vesicles," Proceedings on NSTI Nanotechnology Conference and Trade Show, vol. 2, 2006, pp. 705-708.
Pier Luigi, et al., "Giant Vesicles," Perspectives in Supramolecular Chemistry, John Wiley & Sons, Ltd., vol. 6, 2000, pp. 33.
Kiyofumi Katagiri, et al., "Preperation of Organic-Inorganic Hybrid Vesicle "Cerasome" Derived frome Artificial Lipid with Alkoxysilyl Head," Chemistry Letters, vol. 28, No. 7, 1999, pp. 661-662.
Kiyofumi Katagiri, et al., "Layered Paving of Vesicular Nanoparticles Formed with Cerasome as a Bioinspired Organic-Inorganic Hybrid," Journal of the American Chemical Society (JACS) Communications, vol. 124, No. 27, 2002, pp. 7892-7893.
Shintaro Iwamoto, et al., "Gemini peptide lipids with ditopic ion-recognition site. Preparation and functions as an inducer for assembling of liposomal membranes", Science Direct, Tetrahedron 60, 2004, pp. 9841-9847.
Masashi Otsuki, et al., "Liposomal Sorting onto Substrate through Ion Recognition by Gemini Peptide Lipids," Chemistry Letters, vol. 35, No. 2, 2006, pp. 206-207.
Yukihiro Tamba, et al., "Single Giant Unilamellar Vesicle Method Reveals Effect of Antimicrobial Peptide Magainin 2 on Membrane Permeability," Biochemistry, vol. 44, 2005, pp. 15823-15833.
Jun-ichi Kikuchi, et al., "An Artificial Signal Transduction System. Control of Lactate Dehydrogenase Activity performed by an Artificial Cell-surface Receptor," Chemistry Letters, vol. 28, No. 3, 1999, pp. 253-254.
Wen-Jie Tian, et al., "Switching of Enzymatic Activity through Functional Connection of Molecular Recognition on Lipid Bilayer Membranes," Supermolecular Chemistry, vol. 17(1-2), Jan.-Mar. 2005, pp. 113-119.
Kazuki Matsui, et al., "Cerasome as an Infusible, Cell-Friendly, and Serum-Compatible Transfection Agent in a Viral Size," Journal of the American Chemical Society (JACS) Communications, vol. 128, No. 10, 2006, pp. 3114-3115.
Office Action mailed Jan. 10, 2012, in Japanese Patent Application No. 2006-248444, filed Sep. 13, 2006 (with English-language Translation).
Junichi Kikuchi, Yoshihiro Sasaki, Masaru Mukai, and Jianfeng Wang, "Intermolecular Communication at Interface of Artificial Cell Membrane", the SPSJPPJ (the SPSJ Polymer Preprints, Japan), the Society of Polymer Science, Japan (SPSJ), Sep. 5, 2005, vol. 54, No. 2, pp. 5137-5138.

*Primary Examiner* — Lori A Clow
(74) *Attorney, Agent, or Firm* — Oblon, Spivak, McClelland, Maier & Neustadt, L.L.P.

(57) ABSTRACT

A disclosed molecular communication system includes a molecular transmitter configured to transmit an information molecule in which prescribed information is encoded, a molecular receiver configured to receive the information molecule, and a molecular capsule configured to carry the information molecule from the molecular transmitter to the molecular receiver. Each of the molecular transmitter, the molecular receiver, and the molecular capsule has an artificial cell membrane in which at least one kind of molecular switch is embedded, the molecular switch being responsive to an external input signal so as to control association and separation between the molecular transmitter and the molecular capsule, and association and separation between the molecular capsule and the molecular receiver, upon application of the external input signal.

20 Claims, 9 Drawing Sheets

SYSTEM AND METHOD FOR MOLECULAR COMMUNICATION

TECHNICAL FIELD

The present invention generally relates to molecular communication, and more particularly, to a molecular communication system and method for transmitting information, using molecular capsules, between a molecular transmitter and a molecular receiver structured with lipid bilayer membranes.

BACKGROUND OF THE INVENTION

In recent years and continuing, studies and research have been made on molecular communication systems using nano-scale chemical substances (molecules) as information carriers. With a molecular communication system, communication is established based on biochemical reactions caused upon reception of the information encoded molecules. See, for example, S. Hiyama, et al., "Molecular Communication," Proceedings on NSTI Nanotechnology Conference and Trade Show 2005, vol. 3, pp. 391-394, May, 2005, as well as S. Hiyama, et al., IEICE magazine, Vol. 89, No. 2, pp. 162-166, February, 2006.

Unlike existing communication technologies that use electromagnetic waves (electric signals or optical signals) as information carriers, molecular communication uses biochemical signals which produce slow speed communication with low energy consumption. Molecular communication has high potential for application to communications between nano-scale devices that cannot use electromagnetic waves for capability reasons or environmental reasons and operational control of nanomachines that are not composed of electronic components and cannot be driven by electronic signals.

A molecular communication system generally includes a molecular transmitter, a molecular receiver, and a molecule propagation environment connecting the molecular transmitter and the molecular receiver. The information-coded molecules (which may be referred to simply as "information molecules") transmitted from the molecular transmitter propagate through the propagation environment (or transmission channel) to the molecular receiver. The molecular receiver captures the propagated information molecules, decodes the information, and expresses a biochemical reaction to the information molecules. In order to protect the information molecules from degrading enzymes existing in the propagation environment or from the influence of temperature, acid or base (represented as a pH value), or light, it is also proposed to encapsulate the information molecules in a molecular capsule. See, for example, Y. Moritani, et al., "Molecular Communication among Nanomachines Using Vesicles," Proceedings on NSTI Nanotechnology Conference and Trade Show 2006, Vol. 2, pp. 705-708, May 2006.

One of the candidates for a molecular transmitter and/or receiver used in the molecular communication system is a living cell because a living cell has the basic functions of a molecular transmitter/receiver. However, the structures and behaviors of living cells are complicated, and it is very difficult to artificially design and control the functionality of living cells.

SUMMARY OF INVENTION

In view of the above-described technological background, the embodiments of the present invention aim to provide a technique for artificially designing the components used in the molecular communication system. The embodiments of the invention also provide a technique for artificially controlling transmission and reception of information molecules and biochemical reactions occurring in the molecular receiver. In short, it is an objective of the embodiments to provide a well-controlled artificial molecular communication system and method.

To achieve the objective, an artificial cell membrane in which at least one kind of molecular switch responsive to an external input signal is used to form a molecular transmitter, a molecular receiver, and a molecular capsule. The artificial cell membrane is, for example, a lipid bilayer membrane. The external input signal is, for example, light, temperature, a chemical substance, or a characteristic of a solution (e.g., a pH level). By regulating application of the external input signal, association and separation of the molecular capsule with and from the molecular transmitter, as well as association and separation of the molecular capsule with and from the molecule receiver, are controlled.

An artificial signaling cascade having a functional structure for connecting an artificial receptor and an enzyme that serves as an effector may be provided to the molecular receiver to control the switching of the activity of the enzyme upon reception of the information molecule. This arrangement can artificially control the biochemical reaction occurring in or on the molecular receiver.

In an embodiment of the invention, a molecular communication system is provided that includes a molecular transmitter that transmits an information molecule in which prescribed information is encoded, a molecular receiver that receives the information molecule, and a molecular capsule that carries the information molecule from the molecular transmitter to the molecular receiver. The molecular transmitter, the molecular receiver, and the molecular capsule are formed of a lipid bilayer membrane in which at least one kind of molecular switch responsive to an external input signal is provided.

With this system, by applying the external input signal, association and separation of the molecular capsule with and from the molecular transmitter, and association and separation of the molecular capsule with and from the molecular receiver are regulated, and consequently, transmission and reception of the information molecule are controlled.

In a preferred example, the molecular receiver has an artificial signaling cascade for functionally connecting an artificial receptor and an enzyme (serving as an effector). In this case, the molecular capsule carries an information molecule that serves as an input signal to the artificial receptor. When the information molecule is received at the molecular receiver, the information molecule affects to the artificial receptor, and as a result, the activity of the enzyme changes.

In this manner, the transmission and the reception of the information molecules can be artificially controlled by the external input signal (such as light, temperature, a chemical substance, or the pH environment) in the molecular communication system established by an artificially produced molecular transmitter, molecular receiver, and molecular capsule. In addition, the biochemical reaction occurring in the molecular receiver upon reception of the information molecule can also be artificially controlled.

BRIEF DESCRIPTION OF THE DRAWINGS

Features and advantages of the invention will become more apparent from the following detailed description when read in conjunction with the accompanying drawings, in which.

DETAILED DESCRIPTION OF THE PREFERRED EMBODIMENTS

Figure 1:
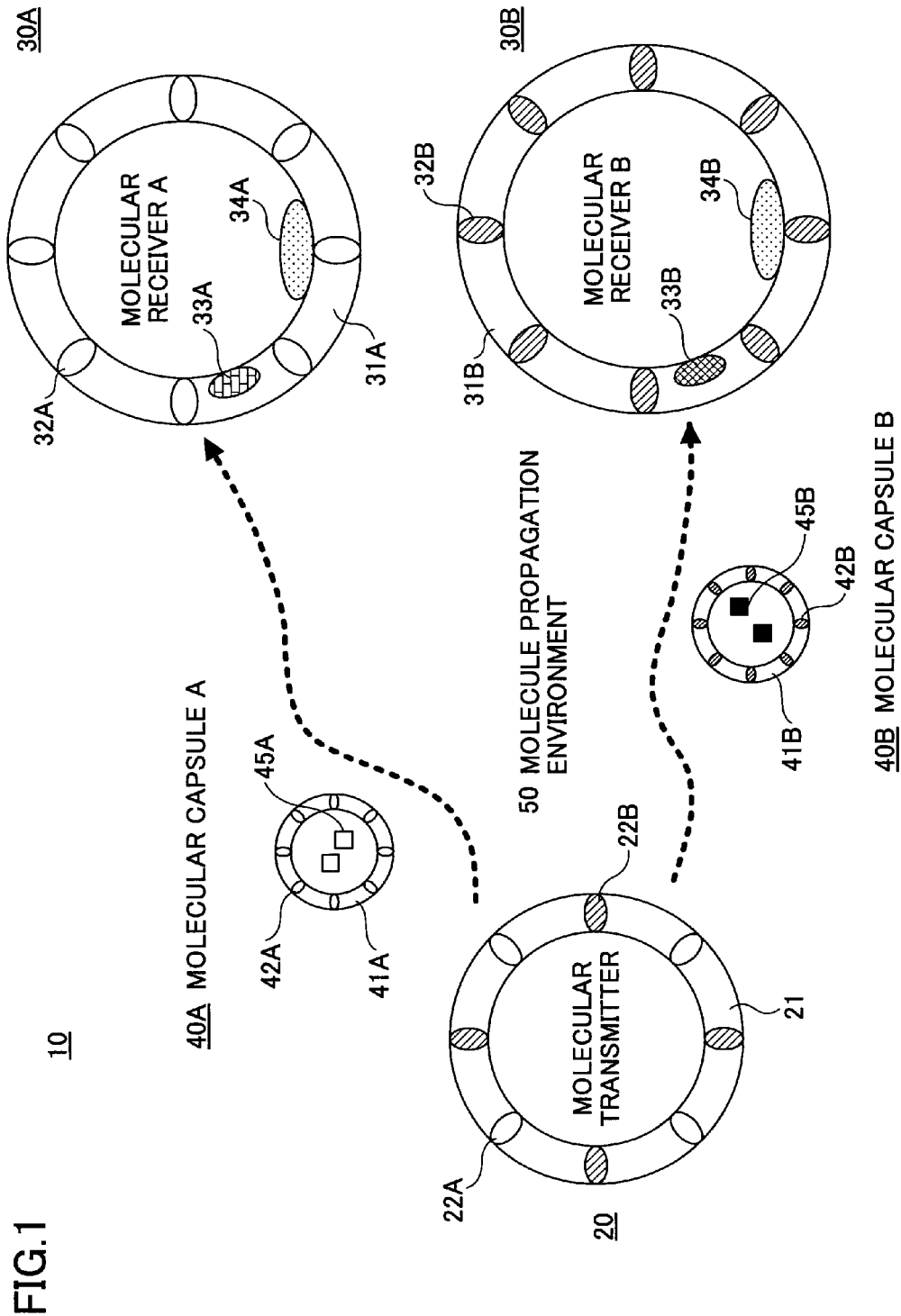
FIG. 1 is a schematic diagram illustrating a molecular communication system 10 according to an embodiment of the invention.

The preferred embodiments of the present invention are now described in conjunction with the attached drawings. FIG. 1 is a schematic diagram illustrating the basic structure of a molecular communication system according to an embodiment of the invention. The molecular communication system 10 includes a molecular transmitter 20, molecular receivers 30A and 30B, molecular capsules 40A and 40B, and a molecule propagation environment 50 in which the molecular capsules 40A and 40B propagate. The molecular capsules 40A and 40B carry the information molecules 45A and 45B, respectively, either encapsulating them inside or retaining them on the surface.

The molecular transmitter 20 is formed of an artificial cell membrane 21 in which one or more kinds of molecular switches 22 responsive to external input signals are embedded. In this example, two kinds of molecular switches 22A and 22B are embedded in the artificial cell membrane 21. The artificial cell membrane 21 is referred to as a giant artificial cell membrane for convenience sake.

In general, various sizes of cell membranes can be produced artificially, ranging from several tens nanometers to several tens micrometers, and it is known that the artificial cell membrane can be produced using phospholipid, which is the primary component of a living cell membrane, or synthetic lipid. For example, a synthetic lipid bilayer membrane with high structural stability can be produced by cross-linking the headgroups of lipids using a siloxane bond which is similar to silica ceramics. The stability has been evinced by dynamic light-scattering measurement, differential scanning calorimetric analysis, and scanning electron microscopy observation. More information about these methods is disclosed in P. Luigi, et al., "Giant Vesicles," ISBN: 0471979864, John Wiley & Sons Inc., 2000; K. Katagiri, et al., "Preparation of Organic-Inorganic Hybrid Vesicle "Cerasome" Derived from Artificial Lipid with Alkoxysilyl Head", Chemistry Letters, vol. 28, no. 7, pp. 661-662, 1999; and K. Katagiri, et al., "Layered Paving of Vesicular Nanoparticles Formed with Cerasome as a Bioinspired Organic-Inorganic Hybrid", Journal of the American Chemical Society, 124, pp. 7892-7893, 2002.

It is also known that molecular switches responsive to external input signals can be embedded in an artificial cell membrane and that such artificial cell membranes with embedded molecular switches can be associated with and separated from each other in response to external input signals. The detailed information is disclosed in S. Iwamoto, et al., "Gemini Peptide Lipids with Ditopic Ion-Recognition Site. Preparation and Functions as an Inducer for Assembling of Liposomal Membranes," Tetrahedron, 60, pp. 9841-9847, 2004; and M. Otsuki, et al., "Liposomal Sorting onto Substrate through Ion Recognition by Gemini Peptide Lipids," Chemistry Letters, vol. 35, no. 2, pp. 206-207, 2006. In this case, the external input signal may be light, temperature, chemical substances, or the pH environment.

The molecular capsules 40A and 40B are also formed of artificial cell membranes 41A and 41B, respectively, in which one or more kinds of molecular switches 42A and 42B responsive to external input signals are embedded, as in the molecular transmitter 20. The artificial cell membranes 41A and 41B are referred to as small artificial cell membranes for convenience sake. In this example, the molecular capsule 40A with only molecular switches 42A embedded, and the molecular capsule 40B with only molecular switches 42B embedded are used. Formation of the small artificial cell membranes 41A and 41B, and embedding of the molecular switches 42A and 42B into the small artificial cell membranes 41A and 41B are the same as those described in conjunction with the molecular transmitter 20.

The molecular capsules 40A and 40B encapsulate the information molecules 45A and 45B, which are ions or proteins, for example, in which prescribed information is encoded. There are several methods for encapsulating the information molecules 45. The simplest method is to put the information molecules 45 in the molecular capsule 40 when artificially producing the molecular capsule 40. Alternatively, an empty molecular capsule 40 may be produced first, and then a chemical substance, such an antimicrobial peptide, is applied to the molecular capsule 40 to form micro pores in the molecular capsule 40, through which pores information molecules 45 are inserted. The formation of the micro pores in a molecular capsule using an antimicrobial peptide is described in, for example, Y. Tamba, et al., "Single Giant Unilamellar Vesicle Method Reveals Effect of Antimicrobial Peptide Magainin 2 on Membrane Permeability," Biochemistry, vol. 44, pp. 15823-15833, 2005.

To fix the information molecules 45 onto the molecular capsule 40, covalent bonding of easy binding and separation, or noncovalent bonding interaction such as electrostatic interaction, coordinate linkage, hydrogen bonding, or hydrophobic interaction can be used. In this case, molecules that can link to the information molecules 45 are embedded in the small artificial cell membrane 41, or alternatively, the information molecules 45 are bound directly to the surface of the small artificial cell membrane 41.

The molecular capsule 40 carrying the information molecules 45 inside or at the surface thereof can be attached to the molecular transmitter 20, and selectively transmitted from the molecular transmitter 20, making use of the property that artificial cell membranes with specific molecular switches embedded therein can be associated with and separated from each other in response to external input signals.

For example, if the molecular switches 22A and 42A are gemini peptide lipids having a photoreactive azobenzene group as a spacer, the external input signal is a light beam. If the molecular switches 22B and 42B are gemini peptide lipids having a pseudo crown ether responsive to a chemical substance, the external input signal is that chemical substance. In these cases, by applying ultraviolet (UV) rays and copper ions ($Cu^{2+}$) to the system, the molecular capsules 40A and 40B can be associated with the molecular transmitter 20.

Figure 2:
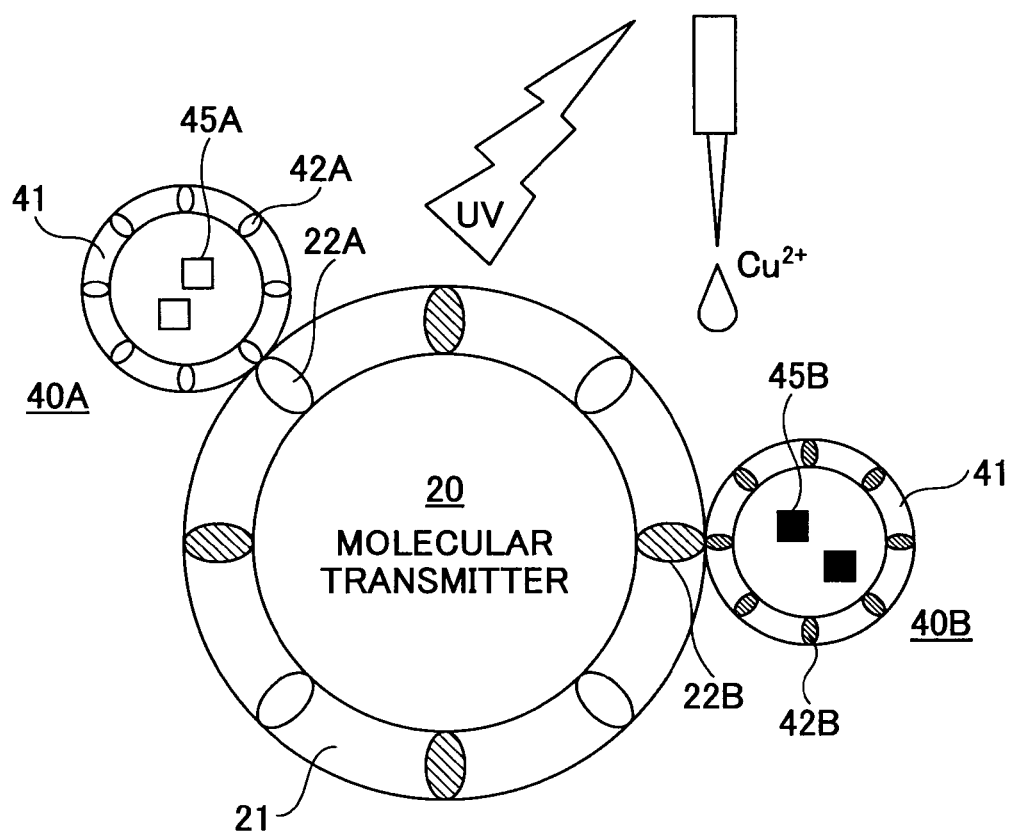
FIG. 2 is a schematic diagram illustrating molecular capsules 40A and 40B associated with the molecular transmitter 20 on the outer surface thereof.
Figure 3A:
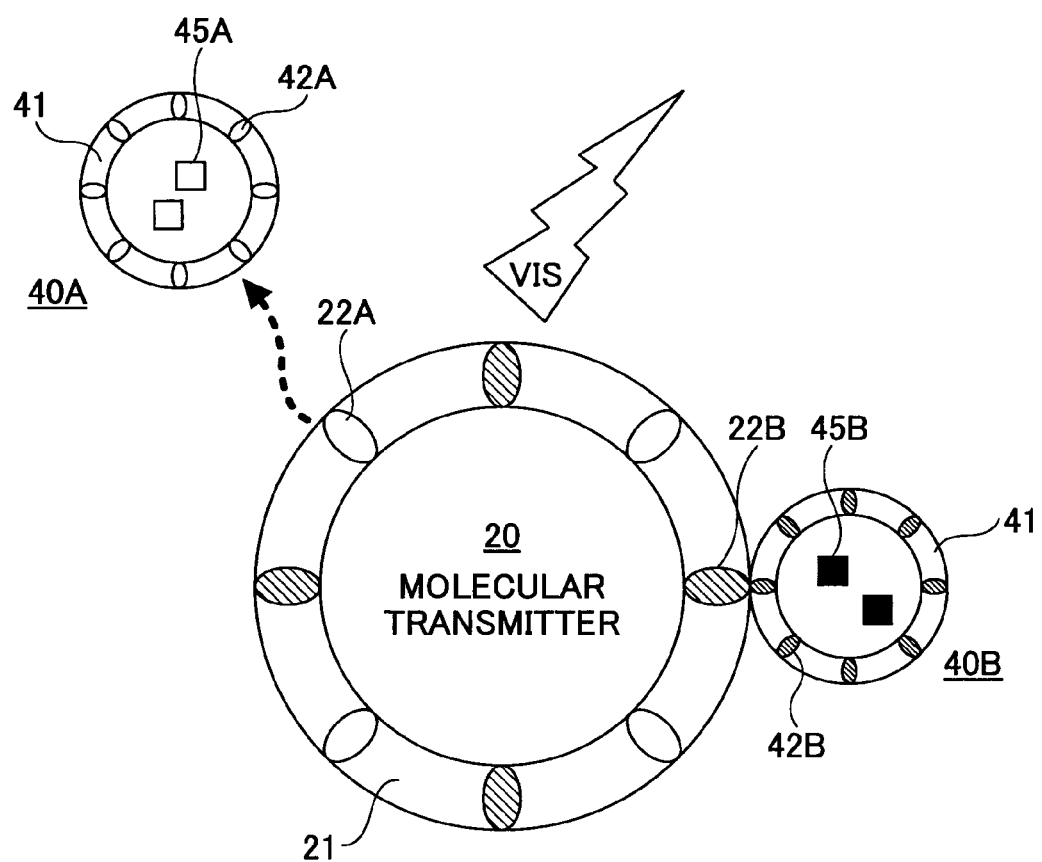
FIG. 3A is a schematic diagram illustrating an example of transmission of the molecular capsule 40A from the molecular transmitter 20.

FIG. 2 is a schematic diagram of the molecular transmitter 20 with which the molecular capsules 40A and 40B are associated upon irradiation of ultraviolet rays and application of copper ions. When visible rays (VIS) are irradiated on the system, only the molecular capsule 40A can be separated from the molecular transmitter 20, as illustrated in FIG. 3A. Consequently, only the molecular capsule 40A is transmitted into the molecule propagation environment 50, while the molecular capsule 40B is still associated with the molecular transmitter 20.

Figure 3B:
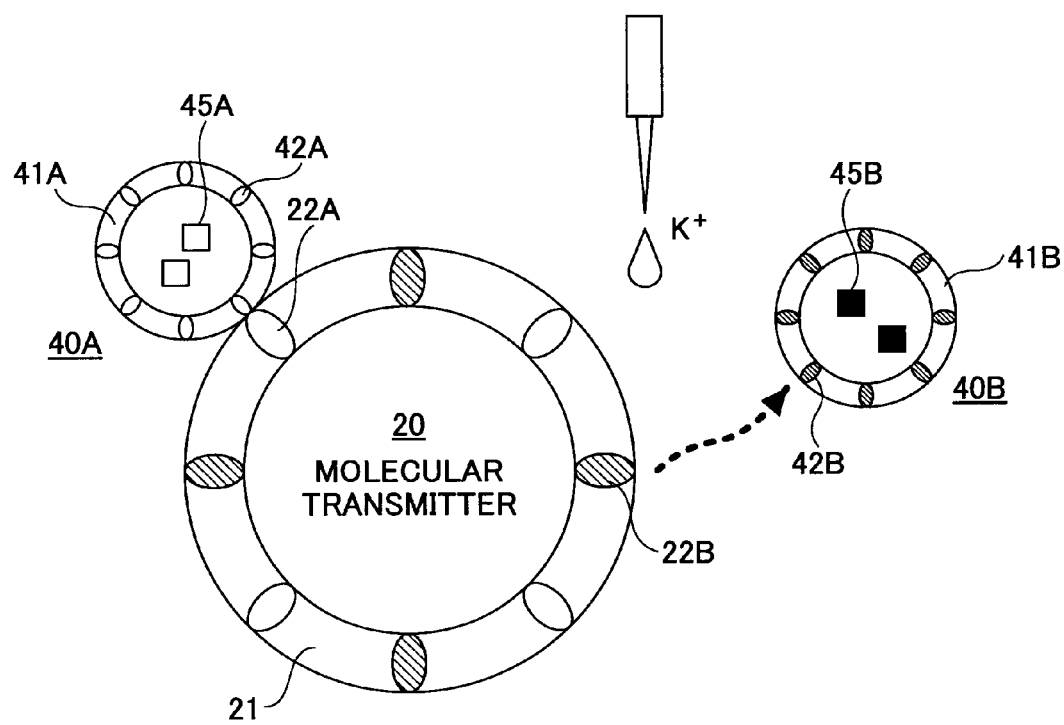
FIG. 3B is a schematic diagram illustrating an example of transmission of the molecular capsule 40B from the molecular transmitter 20.

On the other hand, if alkaline metal ions, such as potassium ions ($K^+$) are applied to the system illustrated in FIG. 2, then only the molecular capsule 40B is separated from the surface of the molecular transmitter 20, as illustrated in FIG. 3B. As a result, the molecular capsule 40B is transmitted into the molecule propagation environment 50 from the molecular transmitter 20.

Figure 3C:
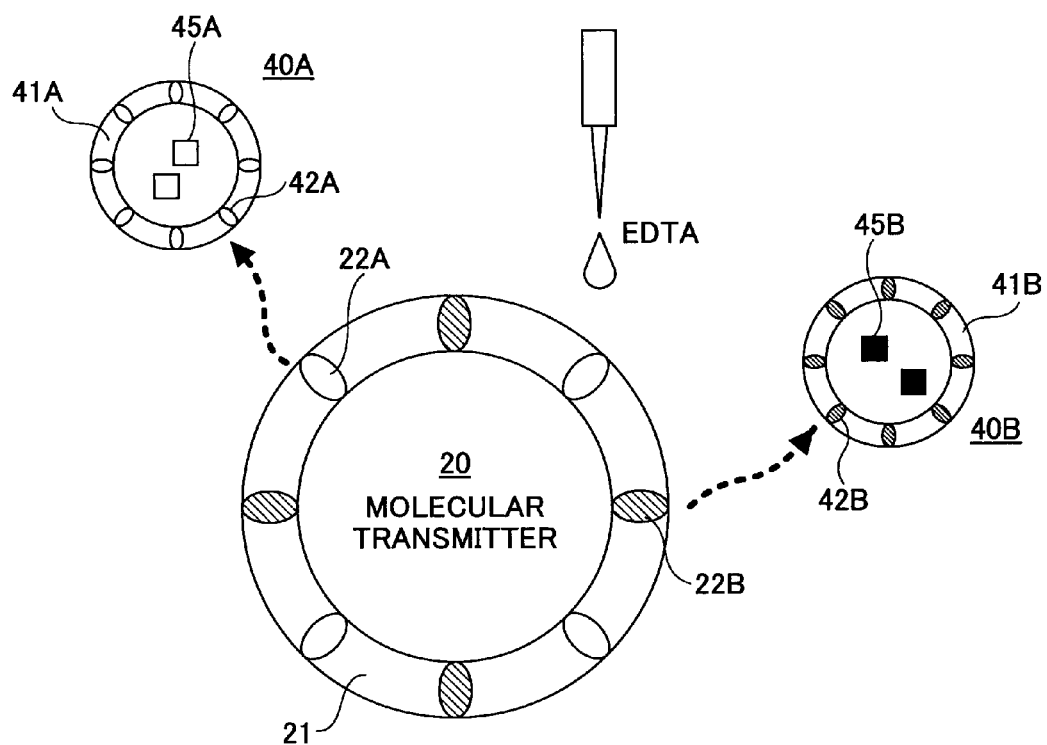
FIG. 3C is a schematic diagram illustrating an example of simultaneous transmission of molecular capsules 40A and 40B from the molecular transmitter 20.

Furthermore, if a chelating agent such as ethylenediaminetetraacetic acid (EDTA) is applied to the system illustrated in FIG. 2, both the molecular capsules 40A and 40B are separated from the molecular transmitter 20, as illustrated in FIG. 3C. As a result, the molecular capsules 40A and 40B are transmitted from the molecular transmitter 20 into the molecule propagation environment 50.

In the above-descried examples, molecular switches 22 and 42 are reactive to light or a chemical substance that serves as an external input signal; however, the invention is not limited to these examples. For example, molecular switches reactive to temperature or the pH level can be used. If a temperature change is used as the external input signal, the phase transition temperature difference between the gel state and the liquid crystal state of a bimolecular membrane can be used. In this case, by controlling the temperature of the system in the range from 0° C. to 100° C., the association and separation of the molecular capsule 40 with and from the molecular transmitter 20 can be performed in a reversible fashion. Similarly, if a pH level is used as the external input signal, the association and separation of the molecular capsule 40 with and from the molecular transmitter 20 can be reversibly performed by controlling the pH level of the system in the range from pH 3 to pH 9. In this manner, a desired molecular capsule 40 can be selectively transmitted from the molecular transmitter 20.

Returning to FIG. 1, the molecular capsules 40 transmitted from the molecular transmitter 20 diffuse in and propagate through the molecule propagation environment 50 formed with a solution to the molecular receiver 30, while carrying the information molecules 45 inside or at the surface thereof. The propagation of the molecular capsule 40 is not limited to diffusion, and a liquid flow (a channel) may be formed between the molecular transmitter 20 and the molecular receiver 30 to transport the molecular capsule 40.

The molecular receiver 30 is also formed with an artificial cell membrane 31 in which one or more kinds of molecular switches 32 responsive to external input signals are embedded. In the example shown in FIG. 1, a molecular receiver 30A with molecular switches 32A embedded and a molecular receiver 30B with molecular switches 32B embedded are illustrated. Formation of artificial cell membranes and embedding of molecular switches responsive to external input signals are the same as those described in conjunction with the molecular transmitter 20. In each of the molecular receivers 30A and 30B, an artificial signaling cascade with a functional structure for connecting an artificial receptor 33 and an enzyme 34 serving as an effector, which signaling cascade is analogical to a G protein-coupled receptor, is provided at the inner surface of the artificial cell membrane 31. It is known that an artificial signaling cascade functionally connecting an artificial receptor 33 and an enzyme 34 can be constructed on an artificial cell membrane 31, and the details of the technique are described in, for example, J. Kikuchi, et al., "An Artificial Signal Transduction System. Control of Lactate Dehydrogenase Activity Performed by an Artificial Cell-surface Receptor," Chemistry Letters, vol. 28, no. 3, pp. 253-254, 1999, and W.-J. Tian, et al., "Switching of Enzymatic Activity through Functional Connection of Molecular Recognition on Lipid Bilayer Membranes," Supramolecular Chemistry, vol. 17, pp. 113-119, 2005.

The molecular capsules 40A and 40B carrying the information molecules 45A and 45B and having propagated through the molecule propagation environment 50 are received selectively at the molecular receivers 30A and 30B, respectively, making use of the property that artificial cell membranes with specific molecular switches embedded are associated with each other in response to an external input signal.

Figure 4A:
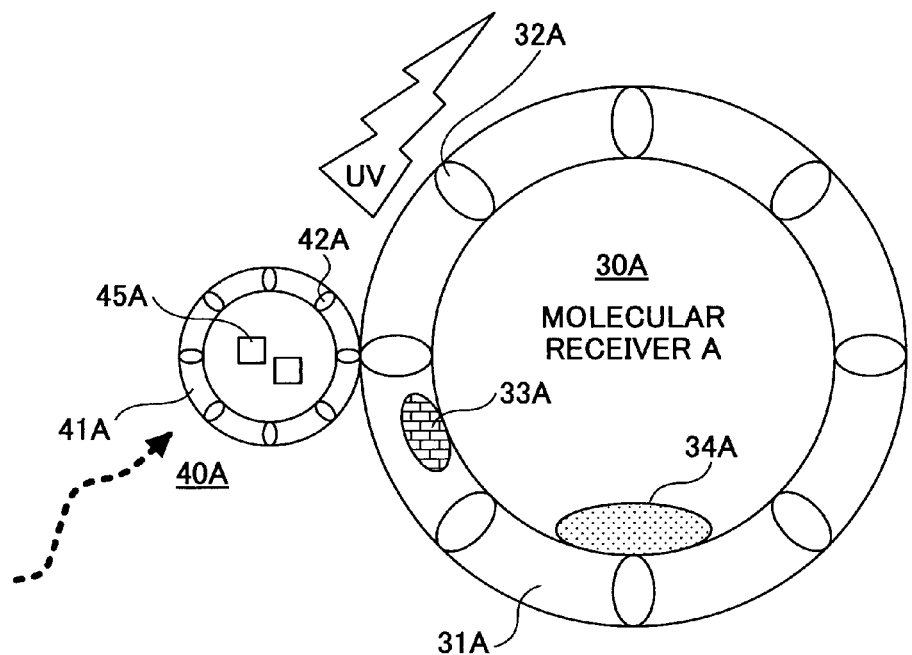
FIG. 4A is a schematic diagram illustrating an example of selective reception of the molecular capsule 40A at the molecular receiver 30A in the molecular communication system shown in FIG. 1.
Figure 4A:
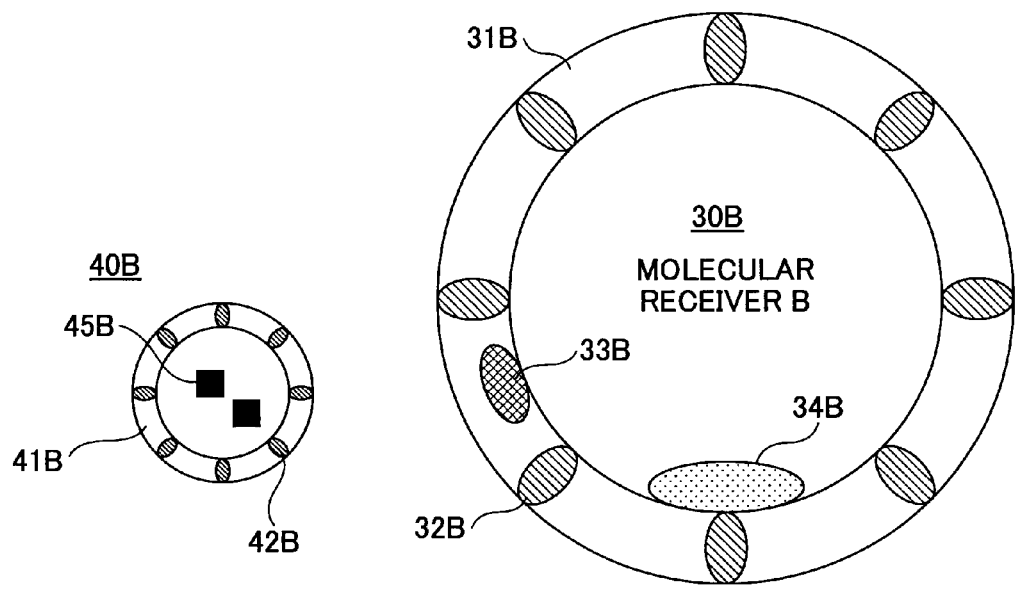

FIG. 4A illustrates an example of selective reception of the molecular capsule 40A at the molecular receiver 30A. In this example, the molecular switches 32A and 42A are gemini peptide lipids having a photoreactive azobenzene group as a spacer responsive to light, and the molecular switches 32B and 42B are gemini peptide lipids having a pseudo crown ether responsive to a chemical substance as a spacer. By irradiating the system with ultraviolet rays (which serve as external input signals), only the molecular capsule 40A is captured at the surface of the molecular receiver 30A.

Figure 4B:
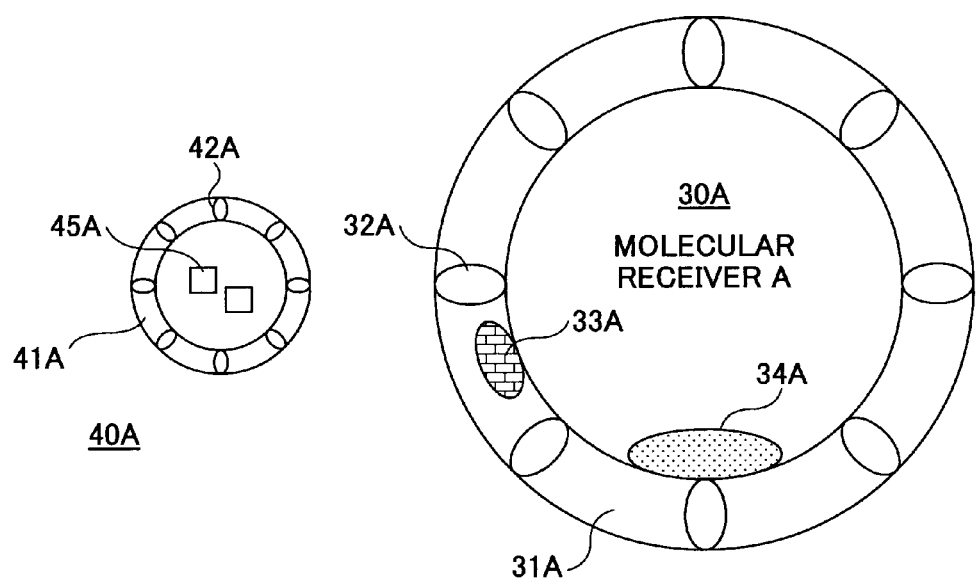
FIG. 4B is a schematic diagram illustrating an example of selective reception of the molecular capsule 40B at the molecular receiver 30B in the molecular communication system shown in FIG. 1.
Figure 4B:
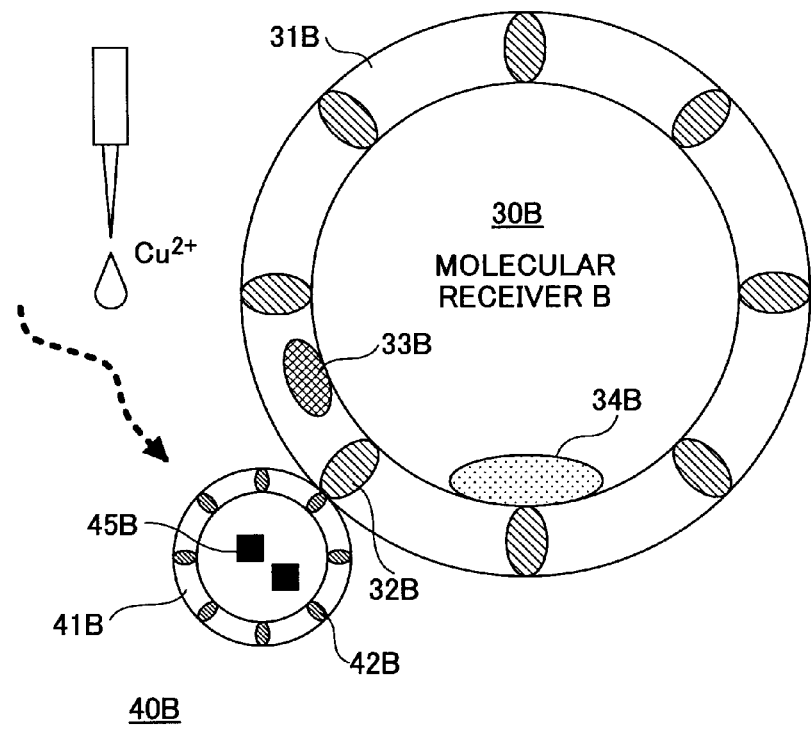

FIG. 4B illustrates an example of selective reception of the molecular capsule 40B at the molecular receiver 30B. If the same molecular switches as those in FIG. 4A are employed in the system, and if copper ions ($Cu^{2+}$) are applied to the system, only the molecular capsule 40B is captured at the surface of the molecular receiver 30B.

It should be noted that any kind of molecular switches can be used as long as they can be associated with and separated from each other in response to an external input signal. Accordingly, an arbitrary molecular switch reactive to an external input signal, such as temperature or pH level, can be employed, other than the above-described examples.

Thus, by using an artificial cell membrane (including a lipid bilayer membrane, for example) with molecular switches embedded therein to shape the molecular transmitter 20, the molecular receiver 30, and molecular capsule 40, selective transmission and reception of molecular capsules 40 that carry information molecules 45 encapsulated inside or fixed to the surface can be realized at the molecular transmitter 20 and the molecular receiver 30, respectively. Consequently, a well-controlled molecular communication system can be provided.

In the above-described examples, two molecular receivers 30A and 30B are provided corresponding to the molecular transmitter 20, and the molecular receiver 30A has molecular switches 32A of a single kind while the molecular receiver 30B has molecular switches 32B of a single kind. This arrangement allows for unicast communication in the molecular communication system 10, in which information molecules 45A and 45B transmitted from the molecular transmitter 20 are forwarded to the corresponding molecular receivers 30A and 30B, respectively, using the associated molecular capsules 40A and 40B having molecular switches 42A and 42B embedded therein. The invention is not limited to such unicast communications, but is also applicable to multicasting and/or broadcasting of the information molecules.

In multicast communication, a certain kind of molecular switch is embedded in molecular receivers 30 belonging to the same group, instead of embedding a unique kind of molecular switch in each of the molecular receivers. In broadcast communication, a certain kind of molecular switch is embedded in all the molecular receivers used in the system. To realize unicasting, multicasting, and broadcasting in the system, three categories of molecular switches, (1) a molecular switch unique to each of the molecular receivers, (2) a group-specified molecular switch used in common in the same group, and (3) a common molecular switch used for all the molecular receivers in the system are provided to each of the molecular receivers 30.

The system can also be designed such that a molecular capsule 40 is delivered to different molecular receivers 30 depending on different external input signals using a molecular capsule 40 with multiple kinds of molecular switches embedded therein. For instance, molecular receivers R1, R2, and R3 have unique molecular switches S1, S2, and S3, respectively, and all the molecular switches S1, S2 and S3 are embedded in a molecular capsule 40. If a signal for controlling the association and separation of the molecular switch S1 is externally input to the system, the molecular capsule 40 carrying information molecules 45 inside or at the surface thereof is delivered to the molecular receiver R1. Similarly, if a signal for controlling the association and separation of the molecular switch S2 is externally input, the molecular capsule 40 is delivered to the molecular receiver R2. Upon receiving the external input signal for controlling the molecular switch S3, the molecular capsule 40 is delivered to the molecular receiver R3.

The molecular capsule 40 can be used in common among unicasting, multicasting, and broadcasting. In this case, different categories of molecular switches 42, namely, a first molecular switch unique to a particular molecular receiver, a second molecular switch used for multiple molecular receivers belonging to a specific group, and a third molecular switch used in common among all the molecular receivers in the system are embedded in the molecular capsule 40. Although in the above-described examples a single molecular transmitter 20 is used in the system, multiple molecular transmitters 20 may be included in the system.

Figure 5A:
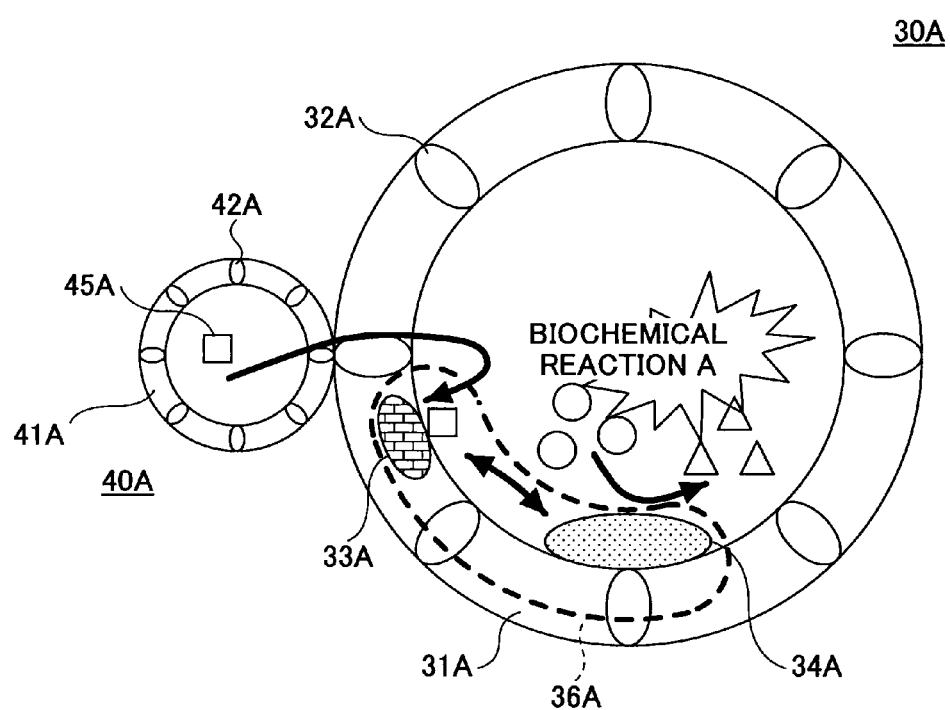
FIG. 5A is a schematic diagram illustrating intake of the information molecule 45A into the molecular receiver 30A after the reception of the molecular capsule 40A.
Figure 5B:
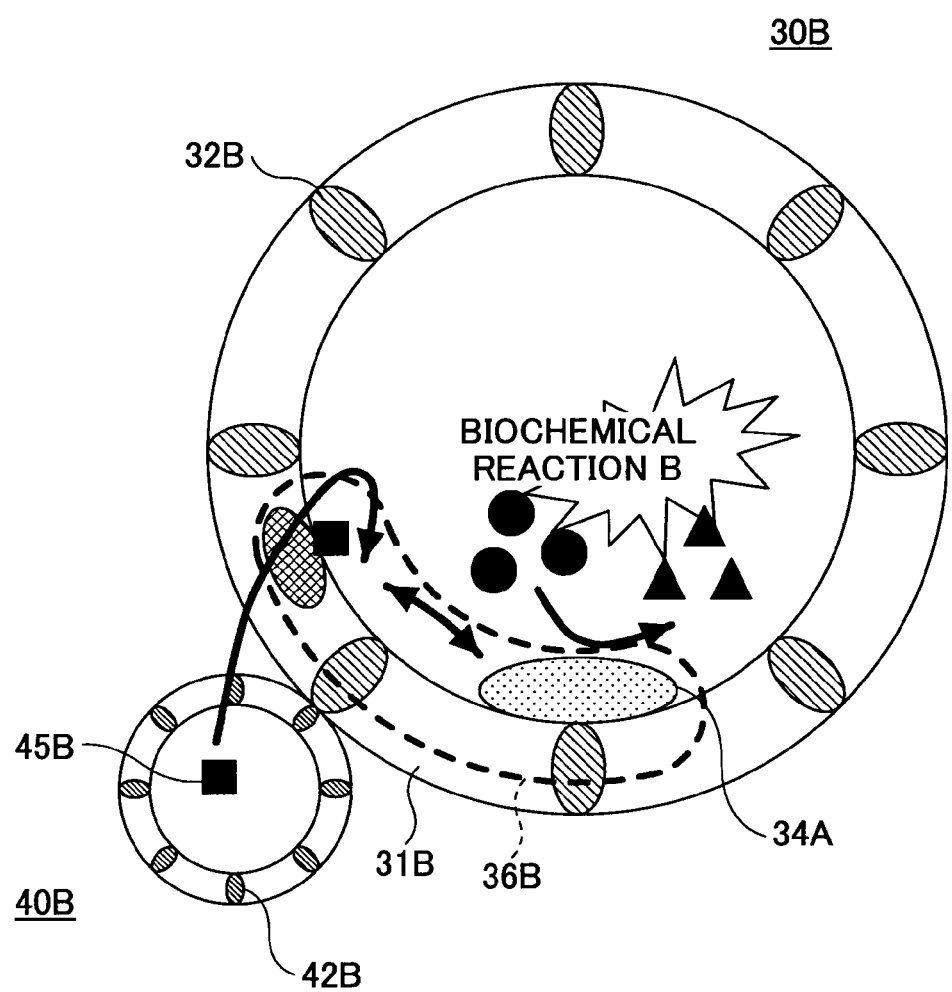
FIG. 5B is a schematic diagram illustrating intake of the information molecule 45B into the molecular receiver 30B after the reception of the molecular capsule 40B.

FIG. 5A and FIG. 5B are schematic diagrams illustrating how the information molecules 45A and 45B are taken into the respective molecular receivers 30A and 30B upon reception of the molecular capsules 40A and 40B. After the molecular capsule 40 is captured at the molecular receiver 30, the information molecules 45 encapsulated in or fixed to the surface of the molecular capsule 40 are taken into the molecular receiver 30. One method for intake the information molecules 45 into the molecular receiver 30 is using a DNA strand as a fusion inducer. In this case, the molecular capsule 40 fuses into the molecular receiver 30, and consequently, the information molecules 45 are taken into the molecular receiver 30.

Fusion of artificial cell membranes using DNA as a fusion inducer is disclosed in, for example, K. Matsui, et al., "Cerasome as an Infusible, Cell-Friendly, and Serum-Compatible Transfection Agent in a Viral Size," Journal of the American Chemical Society, 128, pp. 3114-3115, 2006.

When the molecule receiver 30 is formed of a highly stable synthetic lipid bilayer membrane with the headgroups cross-linked by a siloxane bond similar to silica ceramics, a phospholipid is applied to produce a domain structure (lipid raft) on the surface of the molecular receiver 30. In this case, fusion between the molecular capsule 40 and the molecular receiver 30 is caused at the domain structure by the fusion inducer.

As illustrated in FIG. 5A, upon intake of the information molecules 45A into the molecular receiver 30A, the artificial signaling cascade 36A constructed on the inner surface of the membrane 31A is switched on. Similarly, as illustrated in FIG. 5B, intake of the information molecules 45B into the molecular receiver 30B switches on the artificial signaling cascade 36B constructed on the inner surface of the membrane 31B. The artificial signaling cascade 36 functionally connects an artificial receptor 33 and an enzyme 34 serving as an effector, which signaling cascade is analogous to a G protein-coupled receptor, as has been described above. The signal amplification through the enzyme 34 can be controlled by using the information molecule 45 as a trigger for changing the mediator recognition ability of the artificial receptor 33. To be more precise, by selecting an ion having a recognition ability specific to the artificial receptor 33 as the information molecule 45, by selecting a metal ion (e.g., copper ion) having recognition ability with respect to both the artificial receptor 33 and the enzyme 34 as a mediator, and by molecularly designing the components of the artificial signaling cascade 36 such that the mediator recognition ability of the artificial receptor 33 changes greatly with the presence of the input signal, the signal amplification of the enzyme 34 can be controlled by the information molecule 45.

In this manner, the information molecule 45 taken into the molecular receiver 30 serves as an input signal for activating the artificial signaling cascade constructed on the inner surface of the membrane of the molecular receiver 30 between the artificial receptor 33 and the enzyme 34 to decode the information and express a biochemical reaction to the information molecules.

The number of artificial signaling cascades 36 constructed on the inner surface of the membrane of the molecular receiver 30 is not limited to one; two or more artificial signaling cascades 36 can be provided by fixing multiple artificial receptors 33 and enzymes 34 such that switching is controlled by information molecules 45. In addition, the artificial signaling cascade 36 may be constructed on the outer surface of the artificial cell membrane 31 of the molecular receiver 30, in place of the inner surface of the membrane 31. In this case, the system is designed such that the attracting force between the molecular capsule 40 and the molecular receiver 30 increases when these two are associated with each other and that the molecular capsule 40 and the molecular receiver 30 have appropriate membrane strengths. Upon the capturing of the molecular capsule 40 at the molecular receiver 30, the molecular capsule 40 is deformed and bursts to let the information molecules 45 out of the molecular capsule 40. Alternatively, as described in the above-cited publication as to the formation of micro pores (Y. Tamba, et al., Biochemistry, vol. 44, 2005), an antimicrobial peptide solution is applied to the molecular capsule 40 to form micro pores therein to cause the information molecules 45 to leak out of the molecule capsule 40. Upon the leakage, the information molecules 45 serve as the input signals to the artificial signaling cascade 36 constructed on the outer surface of the membrane of the molecular receiver 30. If the information molecules 45 are fixed to the outer surface of the molecular capsule 40, and if the artificial signaling cascade 36 is constructed on the outer face of the molecular receiver 30, then the artificial signaling cascade 36 is switched upon association between the molecular capsule 40 and the molecular receiver 30.

Thus, the biochemical reaction occurring at the molecular receiver 30 can be controlled artificially through reception of the information molecules 45 in the molecular communication system and method.

Although in the illustrated embodiments the molecular transmitter 20 and the molecular receiver 30 are formed of spherical artificial cell membranes 21 and 31, the shapes of the molecular transmitter 20 and the molecular receiver 30 are not limited to spheres, but are arbitrary shapes. For instance, a container with a U-shaped cross section and with an opening covered with a lipid bilayer membrane may be used.

This international application claims the benefit of the priority date of Japanese Patent Application No. 2006-248444 filed on Sep. 13, 2006, and the entire content of which application is incorporated herein by reference.

The invention claimed is:

1. A molecular communication system comprising:
    a molecular transmitter configured to transmit an information molecule in which prescribed information is encoded;
    a molecular receiver configured to receive the information molecule; and
    a molecular propagation channel extending from the molecular transmitter to the molecular receiver,
    a molecular capsule configured to carry the information molecule from the molecular transmitter to the molecular receiver wherein the molecular capsule is located outside the molecular transmitter at a varying distance from the molecular transmitter to encapsulate the information molecule;
    wherein each of the molecular transmitter, the molecular receiver, and the molecular capsule has an artificial cell membrane, and
    wherein at least one kind of molecular switch is embedded in each of the artificial membranes of the molecular transmitter, the molecular receiver, and the molecular capsule, the molecular switch being responsive to an external input signal so as to control association and separation between the molecular transmitter and the molecular capsule, and association and separation between the molecular capsule and the molecular receiver, upon application of the external input signal to allow unicast, multicast, and/or broadcast communication of the information molecule between the molecular transmitter and the molecular receiver.

2. The molecular communication system of claim 1, wherein two or more of the molecular receivers are included in the system, each of the molecular receivers having a unique molecular switch, and the molecular capsule has a molecular switch corresponding to a target molecular receiver to which the information molecule is to be delivered.

3. The molecular communication system of claim 1, wherein two or more of the molecular receivers are included in the system and grouped into one or more groups, each of the molecular receivers belonging to a same group has a group-specific molecular switch, and the molecular capsule has a molecular switch corresponding to the group-specific switch of a target group to which the information molecule is to be delivered.

4. The molecular communication system of claim 1, wherein two or more of the molecular receivers, each of which has a unique molecular switch, are included in the system and grouped into one or more groups, each of the molecular receivers belonging to a same group has a group-specific molecular switch, and
    the molecular capsule has a first molecular switch corresponding to the unique molecular switch of the target molecular receiver to which the information molecule is to be delivered and/or a second molecular switch corresponding to the group-specific molecular switch of the target group to which the information molecule is to be delivered.

5. The molecular communication system of any one of claims 1-4, wherein the molecular transmitter has one or more of the molecular switches which are the same as those embedded in the molecular capsule.

6. The molecular communication system of claim 1,
    wherein multiple kinds of the molecular switches are embedded in the molecular capsule, and
    wherein two or more of the molecular transmitters are included in the system, each of the molecular transmitters having at least one kind of the molecular switches the same as those embedded in the molecular capsule.

7. The molecular communication system of claim 1, wherein the signaling cascade is constructed on the inner surface of the membrane of the molecular receiver.

8. The molecular communication system of claim 1, wherein the information molecule is an ion having recognition ability to both the artificial receptor and the enzyme.

9. The molecular communication system of claim 1, wherein the information molecule received at the molecular receiver serves as an input signal for activating the artificial signaling cascade constructed on the inner surface of the membrane of the molecular receiver between the artificial receptor and the enzyme to decode the information and express a biochemical reaction to the information molecules.

10. The molecular communication system of claim 1, wherein the signal amplification of the enzyme is controlled by the information molecule.

11. The molecular communication system of claim 1, wherein the signaling cascade is constructed on the outer surface of the membrane of the molecular receiver.

12. The molecular communication system of claim 1,
    wherein the molecular receiver has an artificial signaling cascade connecting an artificial receptor and an enzyme, the molecular capsule carrying an information molecule that serves as an input signal to the artificial receptor,
    wherein an activity of the enzyme changes when the information molecule received at the molecular receiver affects to the artificial receptor.

13. A molecular communication method for delivering an information molecule in which prescribed information is encoded from a molecular transmitter to a molecular receiver using a molecular capsule wherein the molecular capsule is located outside the molecular transmitter at a varying distance from the molecular transmitter, comprising the steps of:
    preparing the molecular transmitter, the molecular capsule, and the molecular receiver, each of which has an artificial cell membrane, at least one kind of molecular switch responsive to an external input signal being embedded in each of the artificial cell membranes;
    encapsulating or fixing the information molecule in or to the molecular capsule;
    applying a first external input signal to the molecular switches of the molecular transmitter and the molecular capsule associated with the molecular transmitter to cause the molecular transmitter to transmit the molecular capsule to allow unicast, multicast, and/or broadcast communication of the information molecule between the molecular transmitter and the molecular receiver; and applying a second external input signal to the molecular switches of the molecular receiver and the molecular capsule delivered toward the molecular receiver to allow the molecular receiver to receive the molecular capsule.

14. The molecular communication method of claim 13, further comprising the steps of:

preparing a plurality of the molecular receivers, each of the molecular receivers being provided with a unique molecular switch;

embedding a molecular switch corresponding to the unique molecular switch of a target molecular receiver, to which the information molecule is to be delivered, in the molecular capsule;

applying the first external input signal to the molecular switches of the molecular transmitter and the molecular capsule associated with each other through the molecular switches to allow the molecular transmitter to transmit the molecular capsule; and applying the second external input signal to the molecular switches of the target molecular receiver and the molecular capsules delivered toward the target molecular receiver to allow the target molecular receiver to receive the molecular capsule.

15. The molecular communication method of claim 13, further comprising the steps of:

preparing a plurality of the molecular receivers and grouping the molecular receivers into one or more groups;

allocating a group-specific molecular switch to each of the groups and embedding the group-specific molecular switch in each of the molecular receivers belonging to a same group;

preparing a plurality of the molecular capsules, each of the molecular capsules being provided with a molecular switch corresponding to the group-specific molecular switch of a target group, to which the information molecules are to be delivered;

applying the first external input signal to the molecular switch of the molecular transmitter and the group-specific molecular switches of the molecular capsules associated with the molecular transmitter to cause the molecular transmitter to transmit the molecular capsules; and applying the second external input signal to the group-specific molecular switches of the molecular receivers of the target group and the molecular capsules delivered toward the molecular receivers to allow the molecular receivers of the target group to receive the molecular capsules.

16. The molecular communication method of claim 13, further comprising the steps of:

preparing a plurality of the molecular receivers, each of the molecular receivers being provided with a unique molecular switch;

grouping the molecular receivers into one or more groups and allocating a group-specific molecular switch to each of the groups, each of the molecular receivers belonging to the same group being provided with a same group-specific molecular switch;

embedding a first molecular switch corresponding the unique molecular switch of a target molecular receiver and a second molecular switch corresponding to the group-specific molecular switch of a target group to the molecular transmitter;

embedding a first molecular switch corresponding to the unique molecular switch of the target molecular receiver and/or a second molecular switch corresponding to at least one group-specific molecular switch of the target group to the molecular capsule;

applying the first external input signal to the first and/or second molecular switch of the molecular transmitter and to the first and/or second molecular switch of the molecular capsule associated with the molecular transmitter to allow the molecular transmitter to transmit the molecular capsule;

applying the second external input signal to the unique molecular switch and/or the group-specific molecular switch of the target molecular receiver and the first and/or second molecular switch of the molecular capsule to allow the molecular receiver to receive the molecular capsule.

17. The molecular communication method of claim 13, further comprising the steps of:

embedding an artificial signaling cascade connecting an artificial receptor and an enzyme to the molecular receiver;

carrying an information molecule that serves as an input signal to the artificial receptor using the molecular capsule; and changing an activity of the enzyme upon reception of the information molecule at the molecular receiver.

18. A molecular transmitter that transmits one or more information molecules to a molecular receiver, comprising:

an artificial cell membrane; and at least one of a first molecular switch corresponding to a unique molecular switch of a target molecular receiver to which the information molecules are to be delivered and a second molecular switch corresponding to a group-specific molecular switch allocated to the molecular receivers belonging to a target group to which the information molecules are to be delivered, the first and/or the second molecular switches being embedded in the artificial cell membrane, wherein the first and the second molecular switches are configured, upon input of an external signal, to be associated with or separated from a molecular switch of a molecular capsule that encapsulates the information molecule wherein said molecular capsule is located outside the molecular transmitter at a varying distance from the molecular transmitter, wherein the molecular receiver has an artificial signaling cascade connecting an artificial receptor and an enzyme and the molecular capsule carries an information molecule that serves as an input signal to the artificial receptor, wherein the activity of the enzyme changes when the information molecule received at the molecular receiver signals the artificial receptor.

19. A molecular receiver used in a molecular communication system in which one or more information molecules are transmitted, comprising:

an artificial cell membrane;

at least one of a unique molecular switch unique to said molecular receiver and a group-specific molecular switch allocated to a group to which the molecular receiver belongs, the unique molecular switch and/or the group-specific molecular switch being embedded in the artificial cell membrane; and an artificial signaling cascade connecting an artificial receptor and an enzyme constructed on the artificial cell membrane, wherein the unique molecular switch and the group-specific molecular switch are configured, upon input of an external signal, to be associated with or separated from a molecular switch of a molecular capsule that encapsulates the information molecule wherein said molecular capsule is located outside the molecular transmitter at a varying distance from the molecular transmitter, wherein the molecular receiver has an artificial signaling cascade connecting an artificial receptor and an enzyme and the molecular capsule carries an information molecule that serves as an input signal to the artificial receptor, wherein the activity of the enzyme changes when the information molecule received at the molecular receiver signals the artificial receptor.

20. An molecular capsule located outside a molecular transmitter and a molecular receiver at a varying distance from the molecular transmitter, said molecular capsule comprising:

an artificial cell membrane that carries the information molecule inside or outside the molecular capsule; and at least one of a first molecular switch corresponding to a unique molecular switch of a target molecular receiver to which the information molecule is to be delivered and a second molecular switch corresponding to a group-specific molecular switch of a target group to which the target molecular receiver belongs, wherein the first and the second molecular switches are configured to be associated with or separated from a molecular switch of a molecular transmitter and a molecular switch of a molecular receiver, upon input of an external signal, wherein the molecular receiver has an artificial signaling cascade connecting an artificial receptor and an enzyme and the molecular capsule carries an information molecule that serves as an input signal to the artificial receptor, wherein the activity of the enzyme changes when the information molecule received at the molecular receiver signals the artificial receptor.

* * * * *